UNITED STATES PATENT OFFICE.

ALADAR PACZ, OF CLEVELAND, OHIO, ASSIGNOR TO GENERAL ELECTRIC COMPANY, A CORPORATION OF NEW YORK.

METHOD OF INTRODUCING MATERIALS INTO MOLTEN METAL.

1,337,093. Specification of Letters Patent. Patented Apr. 13, 1920.

No Drawing. Application filed September 30, 1918. Serial No. 256,208.

*To all whom it may concern:*

Be it known that I, ALADAR PACZ, a citizen of the United States, residing at Cleveland, in the county of Cuyahoga, State of Ohio, have invented certain new and useful Improvements in Methods of Introducing Materials into Molten Metal, of which the following is a specification.

My invention relates to methods of introducing alloying and purifying materials into molten metal baths and its object is to provide a method whereby such materials may be more effectively brought into operative relation with the molten metal.

According to my invention the various materials to be introduced into the molten metal are combined into a coherent mass introduced simultaneously. Oxidation of the materials is thereby lessened because the surrounding mass of other materials and the compactness of the whole practically excludes the air. Moreover the higher specific gravity of certain materials is thus utilized to cause the materials of lower specific gravity to sink into the molten mass and to become much more effective than if they were allowed to float on the surface.

My invention may be carried out by forming briquets containing the various materials in finely divided condition held together by reason of their compression with or without a binder. This is the preferred method although where the materials to be added are simply metals, slugs may be made of the same sintered together or completely fused.

One example of the application of my invention is in the production of special steels. High speed tool steel ordinarily contains tungsten, chromium, vanadium and perhaps others of the rarer metals. If it is desired to add two or more of these metals, a slug or briquet may be made and the advantage secured of the higher specific gravity of the composite metal as compared with the lighter single metals. Moreover if it is desired to add a purifying agent such, for instance, as silica, a briquet may be made of a metal or metals with the silica. It is preferable to intimately mix the silica or other purifying agent with the metal in a finely divided condition. This can be readily done in the case of tungsten by precipitating the silica with the tungstic oxid, reducing the oxid in the mixture to tungsten and forming briquets of the product mixed, if necessary, with a small amount of binder. Mixing by mechanical means is also feasible.

The intimate association of the purifying agent with the tungsten or other metal results in a very thorough purification of the metal when the briquet is added to the molten metal and such purification takes place at the instant when the metals are in position to combine with each other. In other words, the alloying metal or metals are utilized to carry with them their own purifying agent which is caused to act at the right time and place. Moreover, this purifying agent may be in sufficient quantity to exercise a purifying action on the molten bath itself and this function is assisted by reason of the fact that the metal serves to carry the lighter purifying agent down into the molten bath thus rendering it more effective than if it remained at the surface. The purifying agent should be such that it will combine with the oxids of the metal with which it is incorporated at the high temperature of the molten bath to form a slag. In this way certain low oxids which are difficult to eliminate by ordinary reducing means are eliminated at the precise time when the metal is to enter into combination with that of the molten bath.

It will be obvious that the above described mode of introducing purifying substances is applicable to any metal which may be treated in the molten condition. The metal which is added with the purifying material may be the same as that of the molten bath. For instance, boron or boro-carbids may be briqueted with finely divided copper to be introduced into molten copper or finely divided iron mixed with silica may be added to a molten iron or steel bath.

In some cases the briquet may contain instead of metals the concentrated ores or any suitable compounds of the metals to be introduced together with a suitable reducing agent. In such a briquet a certain quantity of the metals themselves should be included in order to increase the specific gravity. For instance a briquet may be made containing tungstic oxid, carbon and silica mixed intimately together and a certain percentage of metallic tungsten added to increase the weight.

It is to be understood that my invention comprehends not merely the addition of materials intimately mixed or chemically combined, but that it also comprehends the addition of materials which are not mixed or chemically combined in any way. For instance, a piece of tungsten may be fastened to a piece of another material or combination of materials and the advantage secured of the high specific gravity of tungsten.

I have made up briquets consisting of about 98% finely divided tungsten with which was intimately incorporated about 2% of finely divided silica. The silicic acid was precipitated with the tungstic oxid as described in my application, Serial No. 149,915, filed February 20, 1917, after which the mixture was heated up and the tungstic oxid reduced by hydrogen leaving the silica intimately mixed with tungsten. The mixture of the tungsten and silica might also have been made by mechanical means. Briquets formed of this mixture, preferably with a small amount of a binder such as sodium silicate are suitable for addition to molten steel to produce high speed and other special steels.

What I claim as new and desire to secure by Letters Patent of the United States, is:—

1. The method of alloying a metal with a plurality of other metals which differ substantially in specific gravity which consists in forming a briquet containing said other metals in a finely divided condition and dropping said briquet into a molten bath of the first-named metal.

2. The method of adding metals to a molten bath which consists in forming a briquet containing one or more metals in a finely divided condition intimately mixed with a material capable of uniting at high temperatures with oxids or other compounds of one or more of the metals which may be present and dropping said briquet into the molten bath.

3. The method of adding tungsten with or without other metals to a molten bath which consists in forming a briquet containing finely divided tungsten with or without other metals intimately mixed with a material capable of uniting with tungsten oxids at high temperatures and dropping said briquet into the molten bath.

4. A briquet for alloying or purifying purposes comprising one or more finely divided metals intimately mixed with a nonmetallic purifying material.

5. A briquet for alloying or purifying purposes comprising one or more finely divided metals intimately mixed with a material capable of combining at high temperatures with oxids or other compounds which may be present in said metals.

6. A briquet for alloying or purifying purposes comprising finely divided tungsten with or without other metals intimately mixed with a material which will combine with tungsten or other metallic oxids at high temperatures.

7. A briquet comprising tungsten intimately mixed with silica.

8. A composite body for alloying or purifying purposes comprising a plurality of metals differing substantially in specific gravity.

In witness whereof, I have hereunto set my hand this 28th day of September, 1918.

ALADER PACZ.